(12) United States Patent
Chu et al.

(10) Patent No.: US 11,760,165 B2
(45) Date of Patent: Sep. 19, 2023

(54) HEATING DEVICE FOR USE THEREOF IN A VEHICLE

(71) Applicant: Borgwarner Emissions Systems Spain, S.L.U., Vigo (ES)

(72) Inventors: Robert Chu, Yinzhou District (CN); Sven Schumm, Walheim (DE); Mario Hoppe, Wendlingen (DE); Carlos Manuel Castaño González, Pontevedra (ES); Julio Abraham Carrera Garcia, Vigo (ES); Matías Baleato Peón, Santiago de Compostela (ES); Alejandro Vargas Curto, Vigo (ES)

(73) Assignee: Borgwarner Emissions Systems Spain, S.L.U.

( * ) Notice: Subject to any disclaimer, the term of this patent is extended or adjusted under 35 U.S.C. 154(b) by 151 days.

(21) Appl. No.: 16/842,140

(22) Filed: Apr. 7, 2020

(65) Prior Publication Data

US 2020/0317027 A1 Oct. 8, 2020

(30) Foreign Application Priority Data

Apr. 8, 2019 (EP) .................................... 19382258

(51) Int. Cl.
*B60H 1/22* (2006.01)
*B60H 1/00* (2006.01)

(52) U.S. Cl.
CPC ....... *B60H 1/2221* (2013.01); *B60H 1/00007* (2013.01); *B60H 1/00385* (2013.01);
(Continued)

(58) Field of Classification Search
CPC .............. B60H 1/2221; B60H 1/00878; B60H 1/00385; B60H 1/00007; B60H 1/2218;
(Continued)

(56) References Cited

U.S. PATENT DOCUMENTS 5,731,568 A * 3/1998 Malecek ............. H01M 10/615
219/209
8,901,457 B2 * 12/2014 Adachi ................ B60H 1/2221
219/202
(Continued)

FOREIGN PATENT DOCUMENTS

CN 108215718 A 6/2018
CN 109210766 A 1/2019
(Continued)

OTHER PUBLICATIONS

Introduction—Heat Transfer and Fluid Flow—Kandlikar (2014); Pertinent pp. 4-5 (Year: 2014).*
(Continued)

*Primary Examiner* — Jenna M Hopkins
(74) *Attorney, Agent, or Firm* — Lerner David LLP

(57) ABSTRACT

A heating device for heating fluids, such as water or a liquid coolant, for application in electric or hybrid vehicles, where the absence of an internal combustion engine or its shorter time of use requires using heating devices for heating either the passenger compartment or other parts of the vehicle that require it. The heating device is provided with a configuration which limits the temperature to the temperature at which heat exchange occurs between the heat generation source and the liquid to be heated, such that the liquid does not generate precipitates, prolonging the service life of the device.

7 Claims, 6 Drawing Sheets

(52) U.S. Cl.
CPC ....... *B60H 1/00878* (2013.01); *B60H 1/2218* (2013.01); *B60H 2001/00307* (2013.01); *B60H 2001/2231* (2013.01); *B60H 2001/2271* (2013.01)

(58) Field of Classification Search
CPC .. B60H 2001/2231; B60H 2001/00307; B60H 2001/2271; B60H 1/2215; F28F 3/025; F24H 3/0429; F24H 1/009; F28D 1/0475; F28D 1/0341; H05B 1/0236
See application file for complete search history.

(56) References Cited

U.S. PATENT DOCUMENTS

| | | | | |
|---|---|---|---|---|
| 8,946,599 | B2 * | 2/2015 | Niederer | F24H 3/0476 219/205 |
| 8,948,582 | B2 * | 2/2015 | Kominami | F24H 3/0429 392/480 |
| 9,186,956 | B2 * | 11/2015 | Kominami | H05B 3/22 |
| 9,377,244 | B2 * | 6/2016 | Kominami | F24H 1/142 |
| 9,895,957 | B2 * | 2/2018 | Eckert | F24H 9/2028 |
| 9,924,565 | B2 * | 3/2018 | Kohl | B60H 1/2226 |
| 10,302,331 | B2 * | 5/2019 | Kohl | F24H 1/121 |
| 10,399,413 | B2 * | 9/2019 | Derx | B60H 1/00064 |
| 10,806,022 | B2 * | 10/2020 | Lim | H05K 5/02 |
| 10,889,164 | B2 * | 1/2021 | McCarthy | H05B 3/24 |
| 2001/0017039 | A1 * | 8/2001 | Weimer | B60H 1/323 62/259.2 |
| 2001/0043808 | A1 * | 11/2001 | Matsunaga | B60H 1/2221 392/494 |
| 2008/0053981 | A1 * | 3/2008 | Adachi | H05B 3/50 219/202 |
| 2011/0180617 | A1 * | 7/2011 | Saito | F24H 3/0429 236/49.3 |
| 2012/0193339 | A1 * | 8/2012 | Adachi | F24H 9/1827 219/202 |
| 2013/0026151 | A1 * | 1/2013 | Adachi | B60H 1/2221 219/202 |
| 2013/0186966 | A1 * | 7/2013 | Taguchi | F24D 13/04 237/57 |
| 2014/0037277 | A1 * | 2/2014 | Kominami | F24H 1/142 392/482 |
| 2014/0050465 | A1 * | 2/2014 | Kominami | B60H 1/2225 392/482 |
| 2015/0034626 | A1 * | 2/2015 | Kominami | B60H 1/2221 219/483 |
| 2016/0069588 | A1 * | 3/2016 | Kominami | B23P 15/26 236/35 |
| 2018/0244127 | A1 * | 8/2018 | Sennoun | F28F 7/02 |
| 2019/0120563 | A1 * | 4/2019 | Nguyen | B60H 1/00278 |
| 2019/0135078 | A1 * | 5/2019 | Adachi | F24H 9/2071 |
| 2019/0135079 | A1 * | 5/2019 | Adachi | B60H 1/2221 |
| 2020/0039324 | A1 * | 2/2020 | Adachi | H05B 1/0236 |
| 2020/0062082 | A1 * | 2/2020 | Hermida | B60H 1/2221 |
| 2020/0156443 | A1 * | 5/2020 | Ding | F24H 9/1818 |
| 2020/0317027 | A1 * | 10/2020 | Chu | B60H 1/2221 |
| 2021/0070147 | A1 * | 3/2021 | Chae | B60H 1/00392 |
| 2021/0148606 | A1 * | 5/2021 | Wulff | F24H 9/1818 |

FOREIGN PATENT DOCUMENTS

| | | | | |
|---|---|---|---|---|
| DE | 102018108407 | A1 * | 10/2019 | ............... F24H 9/02 |
| DE | 102018205314 | A1 * | 10/2019 | ............... H05B 3/06 |
| DE | 102018205316 | A1 * | 10/2019 | ........... B60H 1/2221 |
| DE | 102018205318 | A1 * | 10/2019 | ........... B60H 1/2221 |
| EP | 2562016 | A1 | 2/2013 | |
| EP | 3616949 | A1 * | 3/2020 | ........... H05B 1/0236 |
| EP | 3722124 | A1 * | 10/2020 | ........... B60H 1/2221 |

OTHER PUBLICATIONS

Extended European Search Report for Application No. 19382258.2 dated Oct. 4, 2019, 4 pages.

* cited by examiner

HEATING DEVICE FOR USE THEREOF IN A VEHICLE

CROSS-REFERENCE TO RELATED APPLICATIONS

The present application claims the benefit of the filing date of European Patent Application Ser. No. 19382258.2, filed on Apr. 8, 2019, the disclosure of which is hereby incorporated herein by reference.

OBJECT OF THE INVENTION

The present invention relates to a heating device for heating fluids, such as water or a liquid coolant, for example, which can be applied in electric or hybrid vehicles, for example, where the absence of an internal combustion engine or its shorter time of use requires using heating devices for heating either the passenger compartment or other parts of the vehicle that require it.

The present invention is characterized by a configuration which limits the temperature to the temperature at which heat exchange occurs between the heat generation source and the liquid to be heated, such that the liquid does not generate precipitates, prolonging the service life of the device.

The generation of precipitates produces in a first stage a thermal barrier to heat exchange between the radiant surface and the liquid to be heated, in a second stage this thermal barrier prevents the evacuation of the heat generated by the heat source, and an excessive increase in temperature and the destruction of the heating element therefore occur.

The present invention prevents the first stage of generating precipitates by breaking the chain of events which generate the destruction of the heating device.

BACKGROUND OF THE INVENTION

Internal combustion engines have a very low efficiency from the energy viewpoint because of all the energy available in the fuel, they are only capable of utilizing a very low percentage. The remaining available energy is finally wasted and given off into the atmosphere in the form of heat, or in a best case scenario dedicated to raising the temperature of all those components which are in contact with the combustion chambers or with the exhaust gases generated by said combustion and which must nominally operate at a given temperature that is higher than the atmospheric temperature.

Although this little energy utilization is not desirable from the viewpoint of engine performance, it has the advantage that the internal combustion engine is a more than sufficient heat source, for example for heating the passenger compartment of the vehicle or given components in the initial heating phase after startup until reaching the operating temperature.

Electric vehicles do not have an internal combustion engine and therefore have to meet heating needs with heating devices which use the energy provided by the vehicle batteries, for example. The same occurs with hybrid vehicles where, although there is an internal combustion engine it operates for less time and may not be enough to generate the necessary heat.

Heating devices which make use of a liquid coolant as the fluid to be heated and have resistors for generating the heat that must be transferred to the liquid coolant are known. The liquid coolant is identified as liquid to be heated since these types of liquids are those normally used and are formulated to withstand high temperatures, to have a good heat capacity, and with additives which keep the conduits through which it circulates in good conditions. Nevertheless, the liquid to be heated will hereinafter be generically referred to as thermal fluid.

Going back to the identified heating devices, these devices have to be as small as possible to take up little space and said space must be used for other elements, such as battery storage.

To produce the highest specific heat per volume of heating device, one method consists of using high power resistors. Nevertheless, it has been observed that this high power greatly raises the temperature to the temperature at which heat exchange occurs between the resistor and the thermal fluid, surpassing a critical temperature, which depends on the thermal fluid being used, after which solid precipitates are generated.

The solid precipitates settle on the radiant surfaces which are directly in contact with the thermal fluid, and said precipitates always have a low thermal conductivity. The occurrence of these solid precipitates establishes a thermal barrier over time which prevents the heat generated by the electric resistor from being effectively transferred to the thermal fluid, and as a result the resistor raises its temperature until surpassing its maximum allowable temperature, giving rise to the destruction of the resistor and of a region close to the resistor.

Partial solutions based on the use of thermal sensors which protect resistors against overheating are known; nevertheless, these sensors act when they detect an excessive increase in temperature and therefore limit the power of the resistor when the cause of the damage has already taken place; that is, when the solid precipitates have already occurred. When this happens, even though the device is not overheated, its capacity to generate heat and transfer it to the thermal fluid is limited.

The present invention solves this problem by means of a specific configuration of its design without being necessary to limit the power of the resistors due to overheating, at least due to the occurrence of solid precipitates.

BRIEF SUMMARY OF THE INVENTION

The present invention proposes a solution to the aforementioned problems by means of a heating device for use thereof in a vehicle and configured for heating a fluid, the device comprising:
 a chassis comprising a chamber for the thermal fluid;
 an inlet port for the entry of the thermal fluid;
 an outlet port for the exit of the thermal fluid wherein the inlet port is in fluid communication with the outlet port through the chamber;
 at least one heating plate fixed to the chassis comprising on a first side a heat generation region, and a second side, opposite the first side, forming part of the internal wall of the chamber;
wherein the heating device further comprises a plurality of dissipating elements, with these dissipating elements being on the second side and positioned in correspondence and in thermal communication with at least one part of the heat generation region.

The chassis is the structural element of the device on which all the components are fixed and in turn comprises fixing elements, for example, to be installed in the vehicle.

The chassis comprises a chamber intended for housing the thermal fluid circulating through the device, and it is in this chamber where heat exchange takes place. The chamber is provided with an inlet port for the entry of the thermal fluid to be heated and an outlet through which the thermal fluid exits once it has been heated.

The heating device comprises a heating plate with two sides, a first side where heat generation takes place and a second side, opposite the first side, which is the side where the heat is transferred to the thermal fluid.

The chamber of the heating device is configured in the chassis having a wide opening that is closed at least in part by means of the heating plate, such that the first side is outside oriented towards the outside of the chamber and the second side is the side that is oriented towards the chamber, forming part of the internal wall of the chamber. According to embodiments of the invention, the entire chamber is closed by means of other elements, particularly by means of a second heating plate located in opposition to the first heating plate, for example.

For greater efficiency, the chamber preferably has a flat configuration such that it comprises a space defined between two flat walls, one flat wall formed by the heating plate and one essentially flat wall formed, for example, by the chassis closing the space with a given separation or height of the chamber which is as small as possible so that the ratio between the exchange area with respect to the volume of the chamber, which in the operating mode coincides with the volume of the thermal fluid housed in the chamber at a given time, is maximum without being detrimental to the pressure drop.

The invention makes use of a heating plate like the one described in which the side oriented towards the inside of the chamber and in contact with the thermal fluid comprises a plurality of dissipating elements located such that at least one part of the heat generation region is in correspondence with the position of said dissipating elements.

When it is indicated that it is in correspondence, this is to be interpreted to mean that the area covering the heat generation region, in accordance with a projection according to a direction perpendicular to the main plane of the heating plate, has an overlap with the area covering the dissipating element or elements.

In the preferred example, the dissipating elements are in correspondence with the entire heat generation region.

From the technical viewpoint, optimization of the exchange area with respect to the volume of the chamber establishes that the separation between the surfaces forming the chamber, that is the surface of the heating plate and the surface forming the opposite wall of the chamber, is minimum. Nevertheless, contrary to this criterion, the inclusion of the dissipating elements forces maintaining a larger separation for two reasons, the first because the dissipating elements are housed between both surfaces and project from the surface of the heating plate, and the second because if the separation is not increased, maintaining the pressure drop would not be assured.

Even though the inclusion of protrusions or non-smooth surfaces favor the fixing of deposits due to degradation of the thermal fluid in addition to imposing a larger distance or height of the chamber, it has been observed that the presence of these dissipating elements increases the heat transferred from the heat generation region to the thermal fluid, lowering the temperature of the heat source and thereby preventing the thermal fluid from degrading, generating solid deposits.

After various laboratory tests it has been observed that, far from favoring the fixing of precipitates due to degradation of the thermal fluid, the exchange surface is kept clean throughout the service life of the device, preventing the shortening of said service life for this reason.

According to one embodiment, the heat generation region comprises an electric resistor.

According to another embodiment, the heat generation region comprises a sub-region formed by a plurality of electric resistors configured as a plurality of longitudinal bands distributed parallel and interconnected to one another either in series or in parallel.

According to another embodiment, the heat generation region comprises a plurality of resistor sub-regions, each sub-region with an independent power supply.

According to another embodiment, the dissipating elements comprise fins distributed according to a main direction.

According to another embodiment, the dissipating elements with fins are configured by means of a corrugated folded sheet attached to the heating plate.

According to another embodiment, the attachment between the dissipating elements and the heating plate is by means of brazing.

According to another embodiment, the heating plate comprises:
  a substrate configured as a flat plate, wherein on the first side where the heat generation region is located, it comprises at least one layer of dielectric material, located on the substrate,
  one or more electric resistors arranged on the dielectric layer;
  connection terminals for the power supply of the electric resistor or resistors.

According to another embodiment, the heating plate additionally comprises a protective layer located on the one or more electric resistors.

According to another embodiment, the substrate of the heating plate is made of stainless steel.

According to another embodiment, the dissipating elements are made of aluminum. In this embodiment, the high thermal conductivity of aluminum allows increasing the protective effect on the substrate of the heating plate, which prevents the occurrence of deposits under higher temperature conditions.

According to another embodiment, the dissipating elements are made of stainless steel. In this embodiment, when the substrate of the heating plate is also made of stainless steel, the assembly is more resistant to thermal shocks given that the effects of differential expansions between the heating plate and the dissipating elements are minimized.

According to another embodiment, at least one dissipating element located in the chamber gives rise to channels defined by said dissipating element (1.3) inside the chamber with a hydraulic diameter $\phi_h$, defined as the variable $\phi_h = 4A/p$, with A being the transverse area of the channel and p the perimeter of said channel, in the range of [1.5-5].

According to other more specific embodiments, they make use of a hydraulic diameter $\phi_h$ in the range of [1.5-4].

According to other specific embodiments, they make use of a hydraulic diameter $\phi_h$ in the range of [2-4].

According to another embodiment, the device comprises a plurality of dissipating elements wherein:
  each of the dissipating elements is intended for being located on a limited area of the second side of the heating plate;
  each dissipating element is configured according to a longitudinal direction; and wherein the set of dissipating elements determine a family of routes according to a broken straight path from the inlet port to the outlet port.

Various specific configurations of the device will be described below in the detailed description of the invention.

BRIEF DESCRIPTION OF THE DRAWINGS

These and other features and advantages of the invention will become more apparent from the following detailed description of a preferred embodiment given only by way of non-limiting illustrative example in reference to the attached drawings.

FIG. 4A shows a side front view of the heating device according to the preceding embodiments of the invention in which there is identified a cross-section B-B according to a broken plane, such that the lower part of the plane of section shown in this figure is oblique. FIG. 4B shows section B-B identified in FIG. 4A where the heating plate is cross-sectioned, and the lower part, due to the oblique plane of section, allows observing a perspective view of the resistors and their connectors.

DETAILED DESCRIPTION

Figure 1:
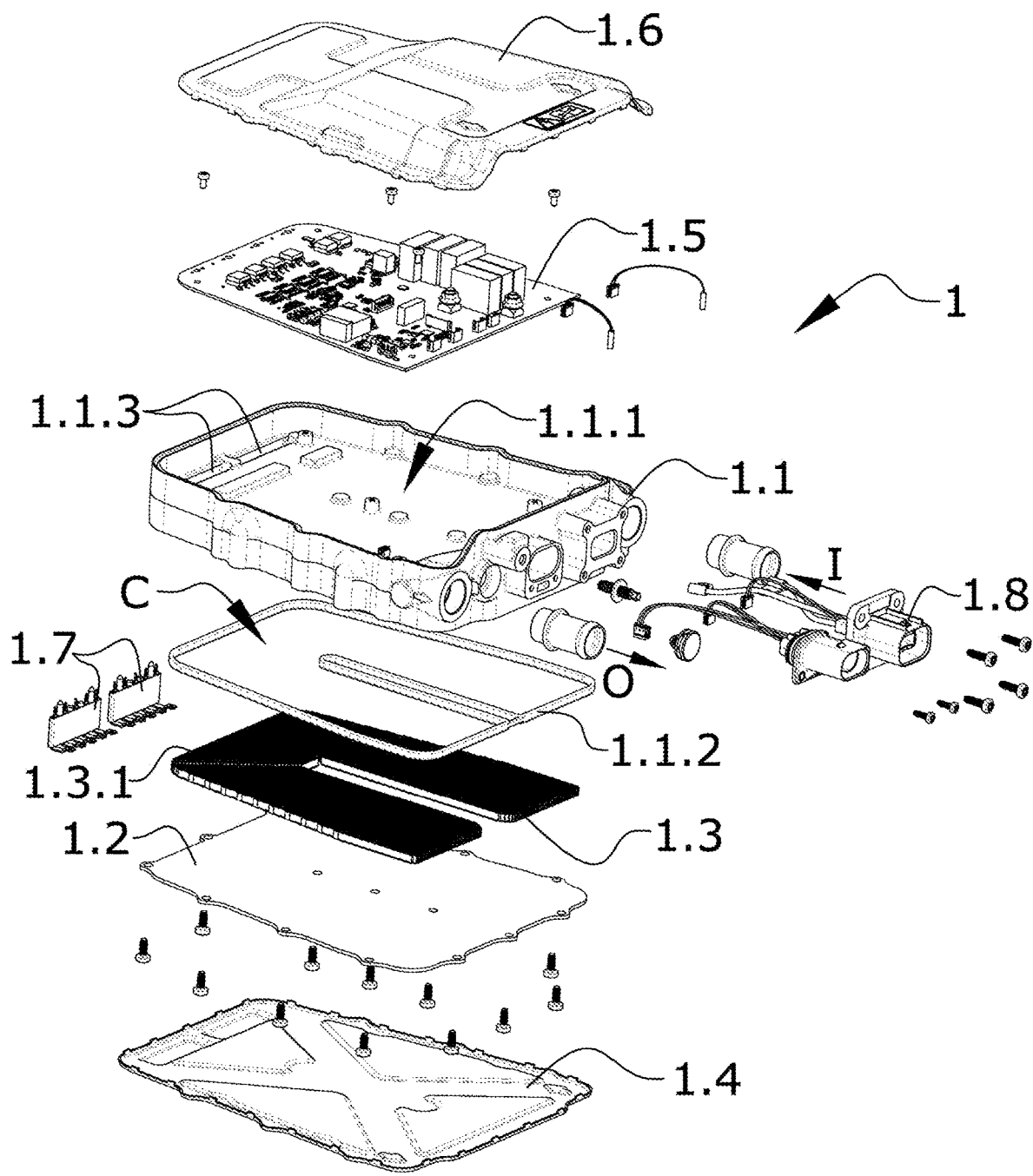
FIG. 1 shows an exploded perspective view of an embodiment in which the set of elements forming the heating device is shown.

FIG. 1 shows an exploded perspective view of an embodiment of the heating device (1) wherein the main body is formed by a chassis (1.1) which, in this embodiment, is formed by molded aluminum. The chassis (1.1) is a structural body comprising an inlet port (I) for the entry of the thermal fluid and an outlet port (O) for the exit of the thermal fluid. In this example, both the inlet port (I) and the outlet port (O) are prolonged into a connection spigot. The configuration of the chassis (1.1) is that of a perimetral wall with a separating plate (1.1.1) which gives rise to two spaces, one space on each side of the separating plate (1.1.1).

Above this separating plate (1.1.1) a first space forms a housing for a circuit board (1.5) intended for managing the power supply.

Both the heat generation sources and the elements facilitating heat transfer from the heat generation sources to the thermal fluid are located on the other side of the separating plate (1.1.1), under same following the orientation shown in FIG. 1.

The housing for the circuit board (1.5) is closed with a lid identified in this description as upper lid (1.6).

The heating device (1) comprises a chamber (C) for the thermal fluid which is in communication with the inlet port (I) and with the outlet port (O). According to the invention, the separating plate (1.1.1) of the chassis (1.1) forms one of the walls of the chamber (C) for the thermal fluid, giving rise to a very compact design of the device.

In the same FIG. 1, shown below the chassis (1.1) there is a sealing gasket which is housed in a perimetral groove which is not shown in this perspective view. The chamber (C) has a very small height compared to the area formed by the internal wall formed by the separating plate (1.1.1).

In this embodiment, the walls (1.1.2) are an integral part of the chassis (1.1) configured, for example, during the injection of the main body of the chassis; nevertheless, it is possible to configure the walls (1.1.2) by means of a frame, in an independent part, later attached by means of brazing.

The internal wall of the chamber (C) opposite the wall formed by the separating plate (1.1.1) is formed by a heating plate (1.2), the plate which is responsible for generating and transmitting heat to the thermal fluid.

The heating plate (1.2) shown in the perspective view of FIG. 1 shows a smooth surface formed by the substrate (1.2.1) of the plate (1.2) and above same, also according to the orientation of FIG. 1, a block formed by a set of dissipating elements (1.3).

In this embodiment, the block formed by the set of dissipating elements (1.3) is attached by brazing to the substrate (1.2.1) of the heating plate (1).

This side of the heating plate (1.2) where the dissipating elements (1.3) are located is the side identified as side B.

The opposite side of the heating plate (1.2), the side identified as side A, is the side containing the heat generation elements.

In this embodiment, the heat generation elements are tracks made of resistive material which generate heat by the passage of current. These tracks made of resistive material intended for generating heat by the passage of current will be referred to hereinafter as resistors (1.2.2). According to another embodiment, the heat generation elements are Peltier plates which transfer heat to the substrate (1.2.1) of the heating plate (1.2).

Finally, as shown in the lower part of FIG. 1, the device is closed by a lid referred to as lower lid (1.4).

The separating plate (1.1.1) does not completely close the passage between the space forming the housing of the circuit board (1.5) and the space where the heating plate (1.2) is located, but rather there are openings (1.1.3) which are traversed by connectors (1.7) communicating the heating plate (1.2) with the circuit board (1.5) intended for electrically supplying the heating plate (1.2).

Figures 2, 3:
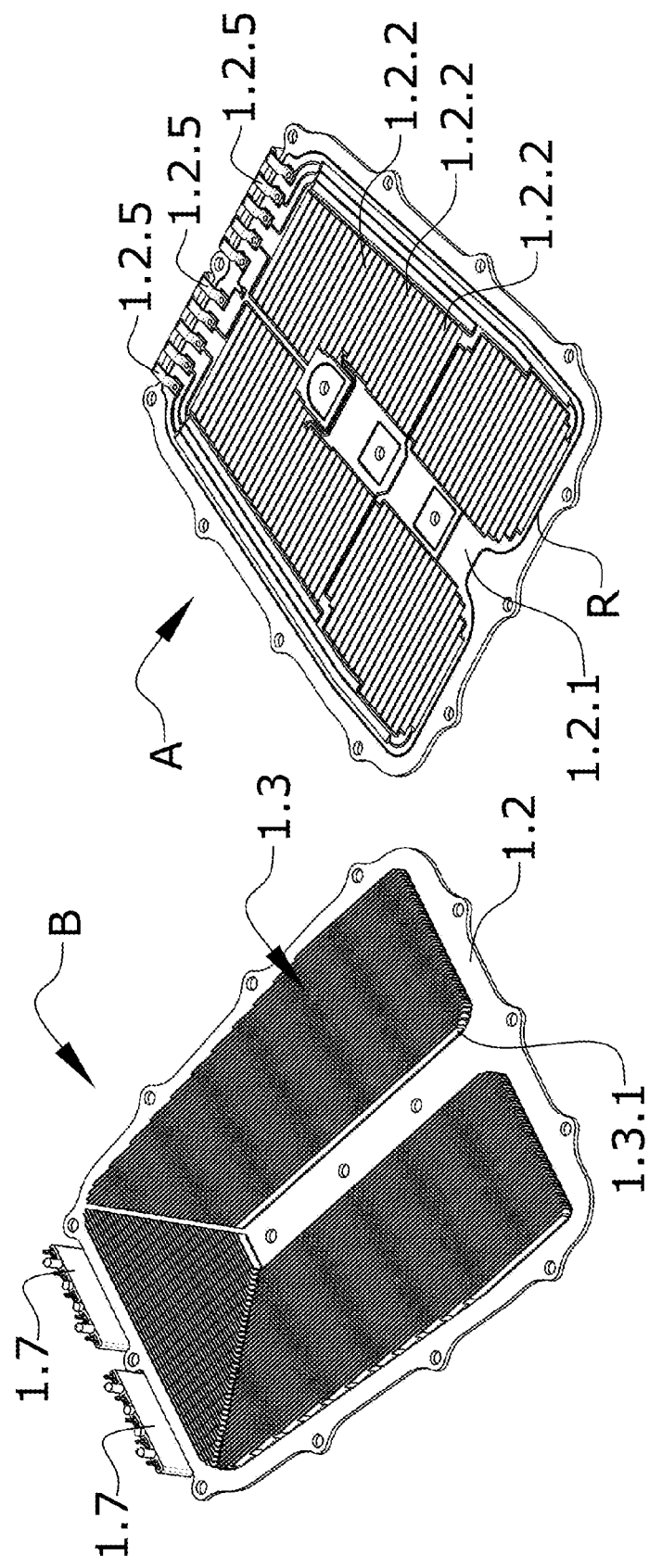
FIG. 2 shows a perspective view of one of the sides of the heating plate, the side on which the heat dissipating elements are located.
FIG. 3 shows a perspective view of the opposite side of the heating plate with respect to what is shown in FIG. 2, the side showing the set of resistors for heat generation.

FIG. 2 shows a perspective view of the heating plate (1.2) on the side where the dissipating elements (1.3) are located, side B, and FIG. 3 shows the opposite side of the same heating plate (1.2), side A, with a region (R) formed by electric resistors (1.2.2) for heat generation.

According to this embodiment, the electric resistors (1.2.2) are configured in the form of flat tracks forming bands which are distributed parallel, forming sub-groups where each sub-group is supplied independently. The entire resistor sub-groups cover the resistor region (R), with this region (R) being the heat generation region and a region subjected to high temperatures.

The heat generated by the electric resistors (1.2.2) is transferred to the other side of the plate through the substrate (1.2.1) of the heating plate (1.2) until reaching the surface of the opposite side.

According to an example that does not belong to the invention, it has been verified that if the side of the heating plate (1.2) which is oriented towards the inside of the chamber (C) is left free, without dissipating elements (1.3), the elevated temperature of the plate corresponding to the position of the electric resistors (1.2.2) degrades the thermal fluid, giving rise to deposits which build up in the same elevated temperature sites. Over time, the solid deposits establish a thermal barrier which prevents dissipating the heat generated by the electric resistors (1.2.2) towards the thermal fluid. The heat that is not dissipated causes the temperature to increase further until reaching an excessive temperature, burning the electric resistors (1.2.2).

Any protuberance in a solid deposit formation environment favors the precipitation of more solids. Nevertheless, contrary to what is expected, in this embodiment dissipating elements (1.3) in the form of projections configured as fins emerging from the surface of the heating plate (1.2) have been included, and as a result, it has been verified that contrary to what is expected the heating device (1) can operate under nominal conditions for long periods of time without solid deposits being formed.

By carrying out experiments with embodiments of the invention where the temperature of the resistors has been raised above the nominal temperature, even reaching extreme values to cause precipitates, it has been verified that the device still operates correctly since heat exchange is maintained through the dissipating elements (1.3) even though the base has many deposits.

Figure 4A:
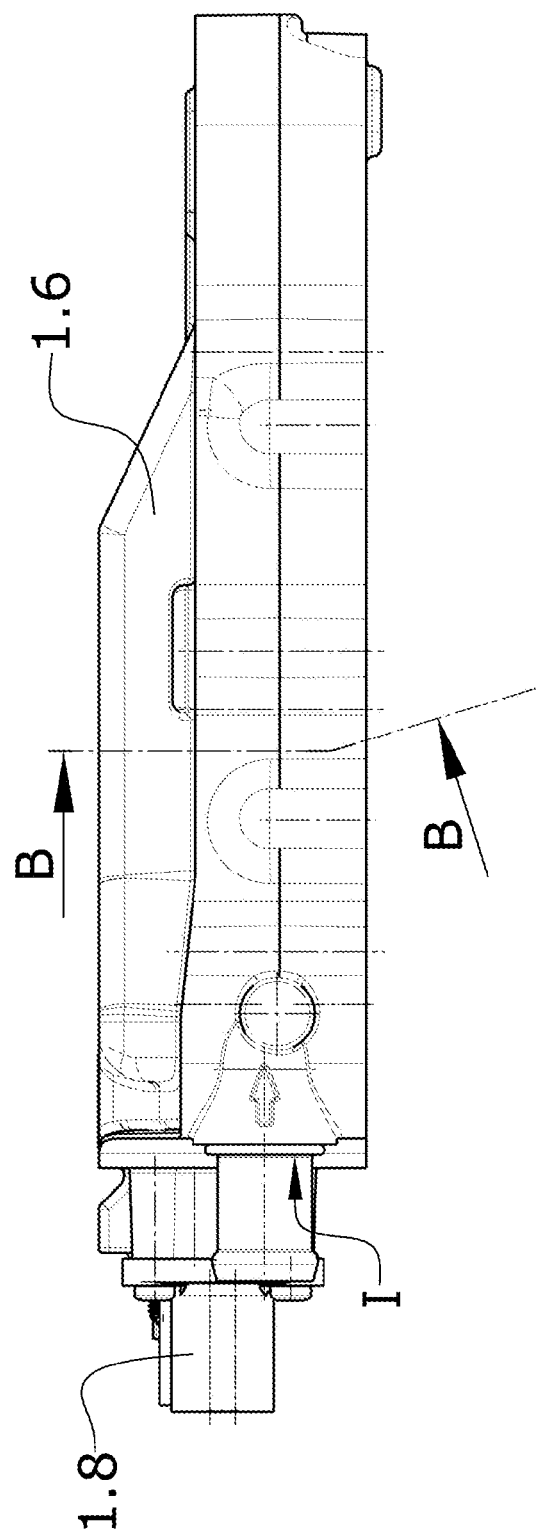
FIGS. 4A-4B.
Figure 4B:
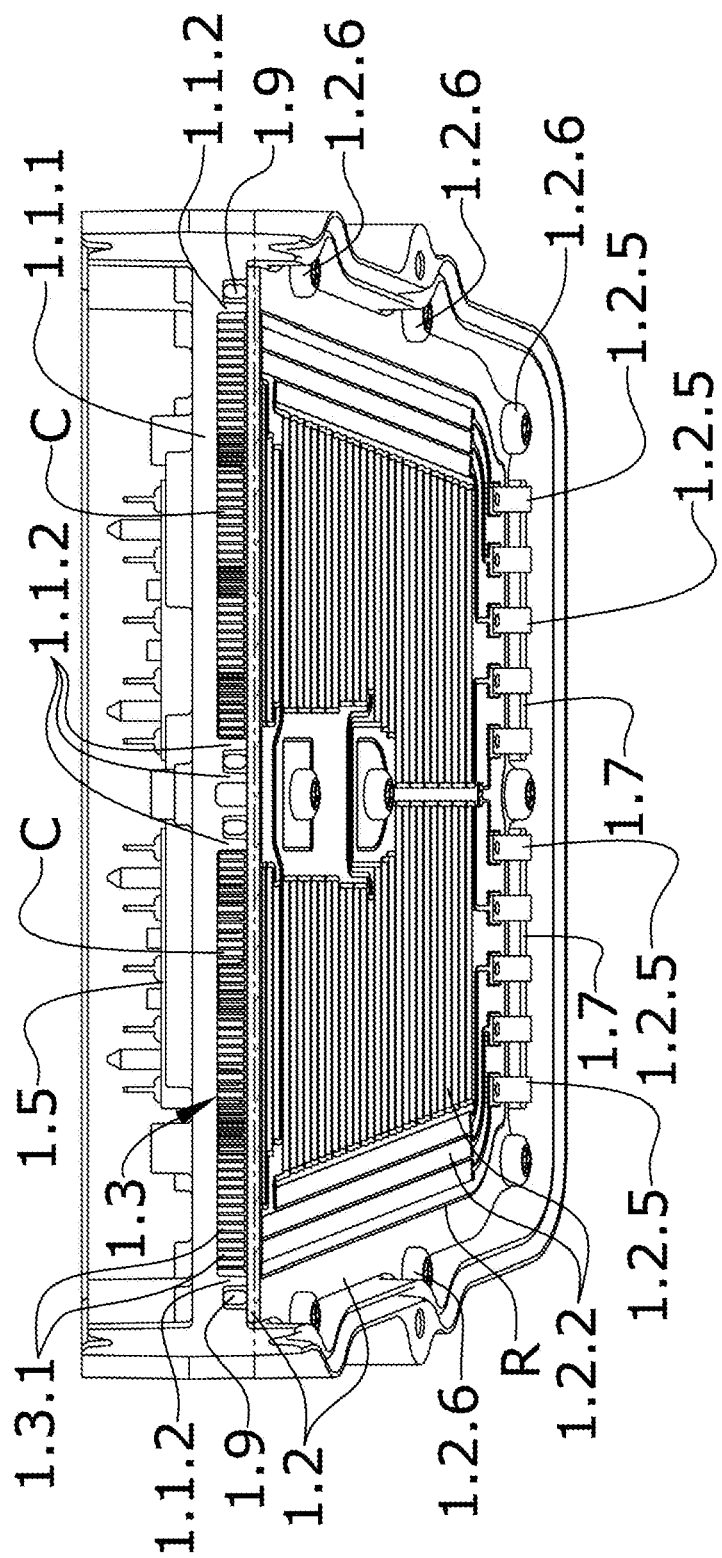

In one embodiment, as is also shown in FIG. 4B, the height of the dissipating elements (1.3) is such that it reaches the opposite surface formed by the separating plate (1.1.1) save a tolerance that is sufficient so as not to make the contact or a contact with forces that may generate fatigue in the materials, due to the effect of expansion.

The embodiment shown in FIGS. 1 to 4B comprises a plurality of dissipating elements (1.3) wherein:
  each of the dissipating elements (1.3) is intended for being located on a limited area of the second side (B) of the heating plate (1.2);
  each dissipating element (1.3) is configured according to a longitudinal direction; and
  wherein the set of dissipating elements (1.3) determine a family of routes according to a broken straight path from the inlet port (I) to the outlet port (O).

In this embodiment, the dissipating elements (1.3) are configured according to a longitudinal direction given that they comprise a plurality of fins (1.3.1) having a straight configuration and distributed parallel to one another.

According to another embodiment, the dissipating elements (1.3) are formed by fins with a wave form extending according to a sinusoidal path. The direction along which the sinusoid extends is the direction identified as longitudinal direction.

In view of FIG. 2, the heating plate (1.2) comprises three dissipating elements (1.3) in turn formed by a plate from which there emerge fins (1.3.1) oriented in a given longitudinal direction. According to this embodiment, the heating plate (1.2) has an essentially rectangular configuration with the inlet port (I) and the outlet port (O) in correspondence with one of the smaller sides of the rectangle.

The first dissipating element (1.3) covers approximately half of the rectangular area extending along the direction established by the larger side of the rectangle. The third dissipating element (1.3) covers approximately the other half of the rectangular area also extending along the direction established by the larger side of the rectangle. The ends of the first and third dissipating elements (1.3) located on the opposite side where the inlet port (I) and the outlet port (O) are located have a chamfered termination, leaving a free area occupied by the second dissipating element (1.3) having an essentially triangular configuration.

The channels formed between the dissipating fins (1.3.1) form a family of routes according to a broken straight path in three segments, a longitudinal segment extending from the inlet port to the opposite end along the first dissipating element (1.3), a second transverse line along the second dissipating element (1.3), and a final longitudinal line along the third dissipating element (1.3) extending to the outlet port (O), the three lines configuring a "U". According to another embodiment, the heating plate (1.2) comprises a single block with the three dissipating elements (1.3) giving rise to continuously extending fins for configuring the "U", for example, by means of stamping in a single part.

Each of the plates with fins (1.3.1) forming each of the dissipating elements is attached by brazing to the substrate (1.2.1) of the heating plate (1.2).

According to another embodiment, as indicated above, one or more dissipating elements (1.3) is formed by a corrugated sheet also attached by brazing to the substrate (1.2.1) of the heating plate (1.2).

FIG. 2 also shows the connectors (1.7) which place the connection terminals (1.2.5) of the electric resistors shown in FIG. 3 in electric communication with respective supply terminals located on the circuit board (1.5) which allows managing the current passing through each of the resistors (1.2.2) from the circuit board, whereas the circuit board (1.5) is separated from the space where the heat is being generated.

FIG. 3 shows heat generation sub-regions formed by groups of resistive tracks distributed in parallel. There are shown on the larger sides of the heat generation region (R) tracks running parallel to the edge for directly supplying each of the groups of resistors directly from an independent terminal. This independence allows separately managing the supply of each of the sub-regions for example if the heat requirements are different in areas of the heating plate (1.2) which are also different.

FIG. 4A shows a side front view of the device which mainly shows the side walls of the chassis (1.1), the upper lid (1.6), the inlet of the thermal fluid to be heated, and the sockets (1.8) for the supply and control of the device, which sockets (1.8) are in communication with the circuit board (1.5), as is also shown in FIG. 1.

FIG. 4A shows the broken line B-B which defines a transverse plane of section which is oblique in its lower part for generating a perspective view of the resistors of the heating plate (1.2).

FIG. 4B shows a section view of the device according to the plane of section B-B shown in FIG. 4A. This section shows the separating plate (1.1.1) which it leaves in the upper part the circuit board (1.5), which is shown in this embodiment with supports separating it from the separating plate (1.1.1) on which it is fixed.

Following the orientation used in FIG. 4B, below the separating plate (1.1.1) there is configured the chamber (C), limited by an upper internal wall and the side walls (1.1.2) integrally formed with the separating plate (1.1.1), and in the lower part, limited by the heating plate (1.2) which is fixed in this embodiment by means of screws (1.2.6). This same section shows a sealing gasket (1.9) assuring the leak-tight closure between the heating plate (1.2) and the chassis (1.1) for configuring the chamber (C).

The inside of the chamber (C) shows the plurality of dissipating elements (1.3) formed by a plate attached by brazing to the heating plate (1.2) and the fins (1.3.1) emerging towards the separating plate (1.1.1), covering the entire height of the chamber (C) and filling in all the available space.

The oblique view of section B-B allows having visual access to the set of resistors extending along the heat generation region (R) in correspondence with the dissipating elements (1.3) located on the other side of the heating plate (1.2).

The resistors (1.2.2) are supplied from the connection terminals (1.2.5) for the supply of the heating plate (1.2), with these connection terminals (1.2.5) being connected to the circuit board (1.5) through the connectors (1.7).

Figure 5:
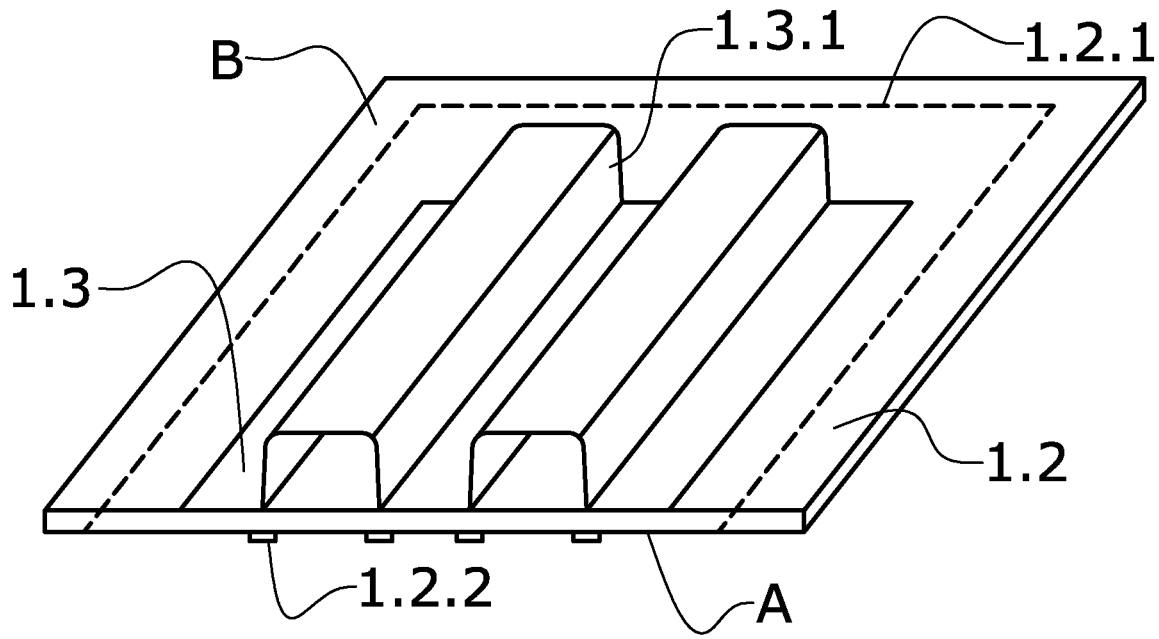
FIG. 5 shows a perspective view of a schematic depiction of a portion of the heating plate according to one embodiment.

FIG. 5 shows a perspective view of a schematic detail of a portion of the heating plate (1.2) with a first lower side A with a heating region (R) identified by a discontinuous line covered by the resistors (1.2.2) which generate the heat which is transferred through the heating plate (1.2) to the second side B, the side shown in the upper part in this figure.

In the upper part, the second side B is where the dissipating element (1.3) is welded, which element in this schematic example is shown in the form of a corrugated sheet which gives rise to fins (1.3.1) connected in twos through a flat surface in the form of a ridge.

Figure 6:
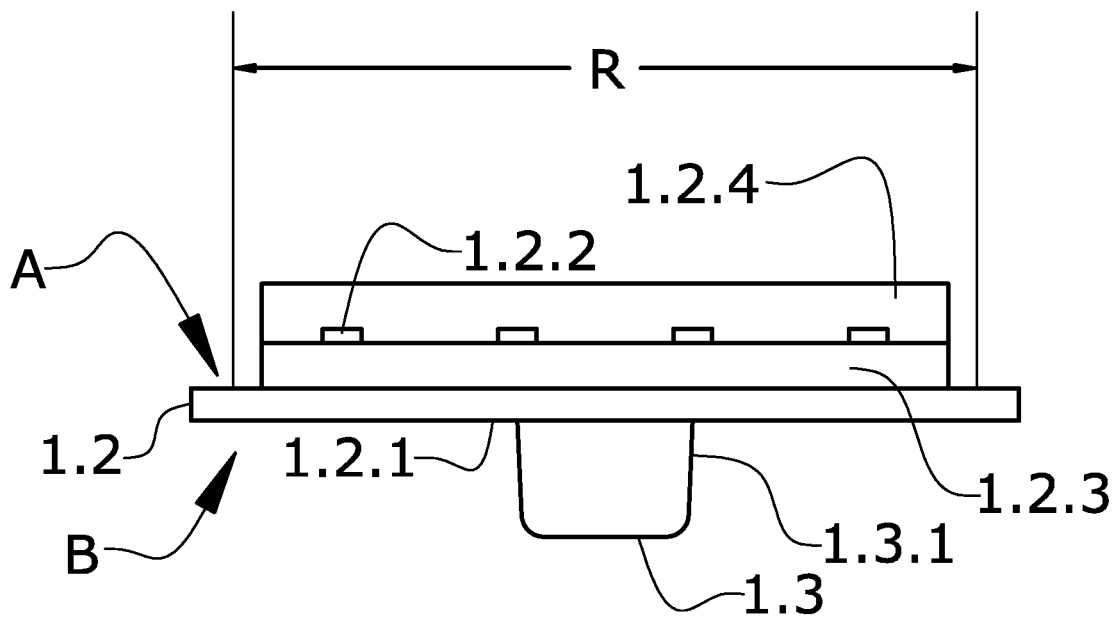
FIG. 6 shows a section view of a schematic depiction of an embodiment of the heating plate where the heating plate is shown opposite to how it is shown in the preceding figure.

FIG. 6 shows a section of the same heating plate (1.2), now shown with the first side A upwards and the second side B downwards. The dissipating element (1.3) is now oriented downwards and attached by brazing to the substrate (1.2.1). Above the substrate (1.2.1), according to one embodiment, there is a dielectric layer (1.2.3) on which the resistors (1.2.2) are arranged and with a protective layer (1.2.4) covering the entire dielectric layer (1.2.3) and the resistors (1.2.2).

That is, the structure of the heating plate (1.2) according to this embodiment comprises:
- a substrate (1.2.1) configured as a flat plate wherein on the first side (A) where the heat generation region (R) is located, it comprises at least one layer (1.2.3) of dielectric material, located on the substrate (1.2.1),
- one or more electric resistors (1.2.2) arranged on the layer (1.2.3) of dielectric material; and
- a protective layer (1.2.4) located on the one or more electric resistors (1.2.2).

According to another embodiment, the heating plate (1.2) also comprises connection terminals, not shown in the figure, for the power supply of the electric resistor or resistors (1.2.2).

Several experiments have been carried out and based on same, a set of configurations has been found in which there is a high degree of safety where, without resulting in a high pressure drop caused by the dissipating elements (1.3) and the channels that they form, conditions which prevent the formation of solid deposits due to the generation of precipitates are generated.

It has been verified that said configurations are those in which the hydraulic diameter $\phi_h$ of the channels formed by the protrusions or projections of the dissipating elements (1.3), the hydraulic diameter defined as the variable $\phi_h=4A/p$, with A being the transverse area of the channel and p the perimeter of said channel, are in the range of [1.5-5].

Out of these configurations, a subset of configurations has been found in which, even though the thermal fluid boils, the temperature is kept below the limit at which the liquid generates precipitates. These configurations have a hydraulic diameter $\phi_h$ in the range of [1.5-4].

An even more specific subset of configurations has been found, where the pressure drop is especially low and where the amount of precipitates is considerably lower. Said set verifies that the hydraulic diameter $\phi_h$ of the channels formed between the protrusions or projections is in the range of [2-4].

The experiments performed indicate that these results are independent of the liquid coolant used as thermal fluid and are also independent of the material of the protrusions.

Figure 7:
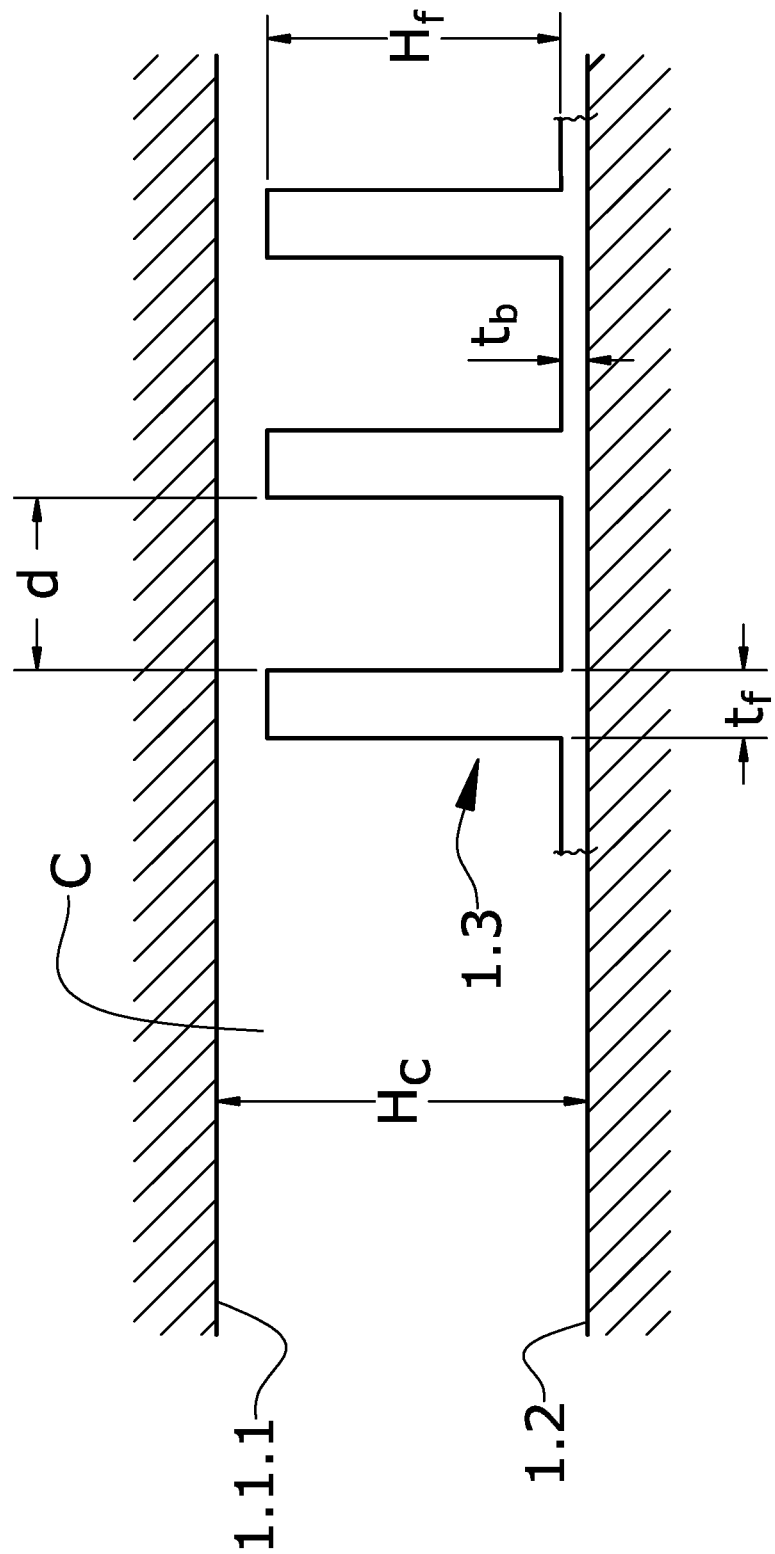
FIG. 7 schematically shows a portion of the chamber with a cross-section of a dissipating element formed by fins and where the most relevant parameters which in this case allow defining the hydraulic diameter of the channels formed by said fins are identified.

FIG. 7 shows a specific case where the dissipating elements are fins having an essentially rectangular section emerging from a base plate and showing a small separation from the opposite surface. FIG. 7 depicts in its lower part the surface corresponding to the heating plate (1.2) and in its upper part the inner wall of the chamber (C) formed by the separating plate (1.1.1) of the chassis (1.1) which gives rise to the opposite inner wall of the chamber (C).

Located on the surface of the heating plate (1.2) is the base plate of the dissipating element (1.3) and on the latter, the fins. FIG. 7 depicts the most relevant parameters of this configuration which allow establishing the hydraulic diameter as the following amount:

$$\phi_h = \frac{4[(H_C - t_b)d + t_f(H_C - H_f - t_b)]}{2[(H_C - t_b) + (d + t_f)]}$$

where
$H_c$ is the separation height between internal surfaces of the chamber (C);
$H_f$ is the height of the fin emerging from the base of the dissipating element (1.3);
$t_b$ is the thickness of the base;
d is the separation between facing surfaces between two consecutive fins; and,
$t_f$ is the thickness of the fin.

In other specific cases, it is necessary to refer to the general definition of hydraulic diameter.

All the features described in this description (including the claims, description and drawings) can be combined in any combination, with the exception of combinations of such mutually exclusive features.

The invention claimed is:

1. A heating device for use thereof in a vehicle and configured for heating a thermal fluid, the heating device comprising:
   a chassis comprising a separating plate;
   an inlet port for the entry of the thermal fluid;
   an outlet port for the exit of the thermal fluid wherein the inlet port is in fluid communication with the outlet port through a chamber for the thermal fluid; and
   at least one heating plate fixed to the chassis comprising on a first side a heat generation region, and a second side, opposite the first side,
   wherein the heating plate has an essentially rectangular configuration with the inlet port and the outlet port in correspondence with one of the smaller sides of the rectangle,
   wherein the chamber for the thermal fluid is defined between the separating plate and the second side of the heating plate,
   wherein the heat generation region comprises at least one electric resistor,
   wherein the heating device further comprises three dissipating elements, with these dissipating elements being on the second side of the heating plate and positioned in correspondence and in thermal communication with at least one part of the heat generation region, wherein the three dissipating elements are made of aluminum, wherein each of the three dissipating elements is intended for being located on a portion of the second side of the heating plate, wherein each of the three dissipating elements comprises fins distributed according to a main direction, wherein the three dissipating elements are a first, a second, and a third dissipating element, wherein an attachment between the three dissipating elements and the heating plate is by means of brazing, and wherein the three dissipating elements determine a family of routes according to a broken straight path from the inlet port to the outlet port, wherein the broken straight path has a "U" shape, such that:

the first and the third dissipating element extend along a direction established by a larger side of the rectangle, and the ends of the first and third dissipating elements located on the opposite side where the inlet port and the outlet port are located have a chamfered termination, leaving a free area occupied by the second dissipating element having an essentially triangular configuration.

2. The heating device according to claim 1, wherein the heat generation region comprises a sub-region formed by a plurality of electric resistors configured as a plurality of longitudinal bands distributed parallel and interconnected to one another either in series or in parallel, and wherein the sub-region is subdivided into a plurality of resistor sub-regions.

3. The heating device according to claim 2, wherein each resistor sub-region has an independent power supply.

4. The heating device according to claim 1, wherein the three dissipating elements with fins are configured by means of at least one corrugated folded sheet attached to the heating plate.

5. The heating device according to claim 1, wherein the heating plate comprises:
   a substrate configured as a flat plate, wherein on the first side where the heat generation region is located, the heating device comprises at least one layer of dielectric material, located on the substrate;
   one or more electric resistors arranged on the layer of dielectric material; and
   a protective layer located on the one or more electric resistors.

6. The heating device according to claim 1, wherein the substrate of the heating plate is made of stainless steel.

7. The heating device according to claim 1, wherein the second dissipating element extends along a transverse direction with respect to the direction of the first and the third dissipating elements.

* * * * *